July 29, 1969    R. SHERMAN    3,458,081
SEAL FOR USE IN CYLINDRICAL PRESSURE AND VACUUM VESSELS
Filed July 12, 1968
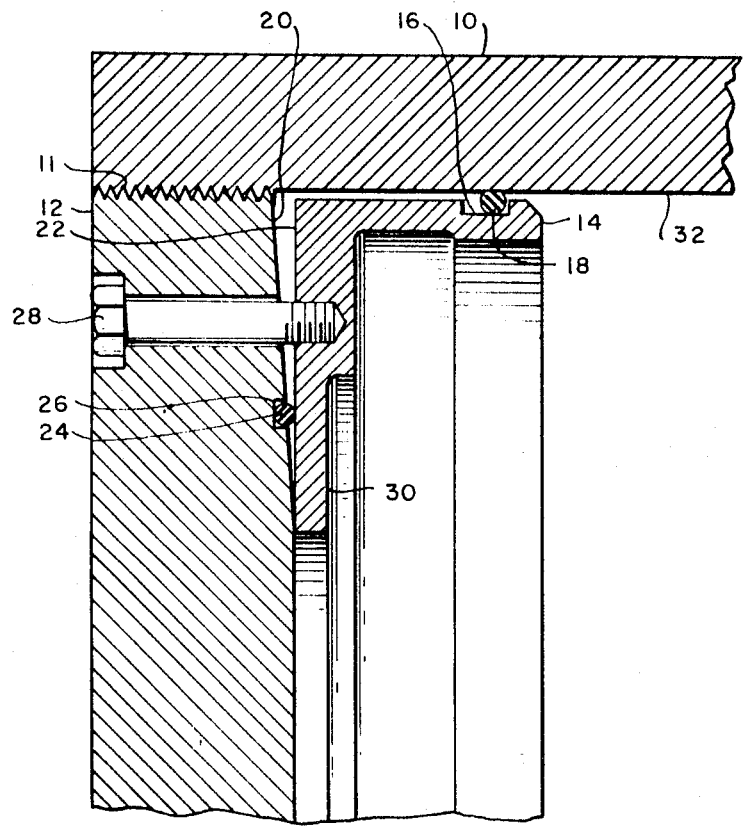
INVENTOR
ROBERT SHERMAN
BY *D. E. Hodges*
ATTORNEY United States Patent Office 3,458,081
Patented July 29, 1969

3,458,081
SEAL FOR USE IN CYLINDRICAL PRESSURE
AND VACUUM VESSELS
Robert Sherman, San Antonio, Tex., assignor, by mesne assignments, to the United States of America as represented by the Secretary of the Navy
Filed July 12, 1968, Ser. No. 744,470
Int. Cl. B65d 53/02; F16l 19/06
U.S. Cl. 220—46                                                6 Claims

ABSTRACT OF THE DISCLOSURE

Apparatus for providing a seal for a pressure vessel in which a resilient ring is mounted on a deformable cup. The seal is accomplished by drawing the cup base against a chamfered surface and causing the ring mounted on the lip of the cup to be rolled into sealing contact with the vessel wall.

Background of the invention

This invention relates to mechanical sealing apparatus for providing a fluid or gas-tight seal by means of a resilient sealing member or ring.

In the prior art devices of this type, a cylindrical member is provided which has a slightly smaller outside diameter than the opening to be sealed. This member is provided with a peripheral groove into which is inserted the resilient sealing ring. The outside diameter of the ring, when attached to the cylindrical member, is made slightly larger than the opening to be sealed and the sealing action is accomplished by compressing the sealing member when the assembly is inserted into the opening. Devices of this type require close tolerancing of the component parts in order to assure a sufficient amount of seal compression to accomplish the seal and yet not cause distortion or damage to the seal when it is inserted into the opening. This requirement for close dimensional tolerance of component parts results in a mechanical assembly which is relatively costly to produce.

The invention described herein overcomes these disadvantages by providing means whereby the cylindrical member which carries the sealing ring may be expanded in diameter after insertion into the opening of the vessel. This feature allows for nominal tolerances on the component parts thus substantially reducing the cost of the assembly.

Summary of the invention

The invention described herein provides a simple and inexpensive apparatus for sealing an opening in a pressure vessel by means of a resilient seal member in which the seal is accomplished by expanding the seal after insertion into the opening. By providing for expansion of the seal after insertion it is not necessary to manufacture the seal components with close tolerances as is the case of present state-of-the-art devices. Further, the manner in which the expansion is accomplished causes the resilient sealing member to be rolled into contact with the inner wall of the opening. This rolling contact assures a tight seal for the vessel opening without damage to the sealing member whether the internal pressure in the vessel is higher or lower than the ambient pressure outside the vessel.

It is therefore an object of this invention to provide a simple, inexpensive sealing apparatus for a pressure vessel.

It is another object of this invention to provide a seal apparatus in which the sealing member is expanded after insertion into the opening to be sealed.

It is yet another object of this invention to provide a sealing apparatus for a pressure vessel in which the seal is accomplished by rolling a resilient member into contact with the surface of the opening to be sealed.

Other objects and many of the attendant advantages of this invention will be readily appreciated as the same becomes better understood by reference to the following detailed description when considered in connection with the accompanying drawings.

Brief description of the drawing

The figure is a view of a cross section through the assembled sealing apparatus.

Description of the preferred embodiment

Referring now to the drawing, there is shown a portion of the wall of a pressure vessel 10; the vessel having an opening which is to be sealed against a pressure differential between the inside of the vessel and the outside ambient pressure. The sealing apparatus is mounted in the opening of the pressure vessel by means of a mounting plate 12 which may be fastened in the opening in any conventional manner, for example, by means of threads 11. There is attached to the mounting plate 12 a cup-shaped ring member 14 which is provided with a peripheral groove 16 located near the lip of the cup. Mounted in the groove is a resilient sealing ring 18 which may be a conventional O-ring or other similar sealing member. The ring member is attached to the mounting plate by means of a plurality of bolts one of which is shown at 28. These bolts may be arranged in any pattern which will provide uniform attachment force between the mounting plate 12 and the ring member 14. There is further provided in the mounting plate a diametral groove 26 into which is mounted a sealing member 24. This groove is located inside the diameter of the mounting bolt pattern. The mounting plate is further provided with a chamfered surface generally shown at 20 which extends from the edge of the mounting plate to a point inside the groove diameter.

The sealing of the opening in the pressure vessel is accomplished in the following manner:

The ring member 14 is assembled to the mounting plate 12 by means of bolts 28 with sealing rings 24 and 18 installed. Bolts 28 are drawn up snug but not tightened fully. The assembled apparatus is then mounted into the opening, in this case by inserting the seal apparatus into the opening and fastening it therein by screwing the mounting plate into threads 11. The diameter of the ring member 14 is made so as to provide clearance between the outside diameter of the ring and the inside diameter of the opening, this clearance being such that the seal member 18 is in light contact with or barely clears, the wall of the opening. After the mounting plate 12 is fully engaged in threads 11 the mounting bolts 28 are drawn tight so as to draw the outward surface 22 of the ring member 14 against the chambered surface 20 of the mounting plate 12.

As can be seen from the drawing, when the ring member is drawn against the surface of the mounting plate the ring will be deformed by bending at the thin section 30. This deformation of the ring member will cause the lip of the ring member to be drawn downward toward the opening and outward toward the wall of the opening. As the lip of the ring member is drawn down and outward the seal member 18 is rolled along wall 32 and groove 16 and pressed against the wall and into the corner of groove 16. The groove 16 is made substantially wider than the thickness of the ring so that the ring may roll in the groove as the cup is deformed. This combined rolling and squeezing action accomplishes a vapor or liquid tight seal in the opening.

The seal member 24, mounted in groove 26, provides a seal ring inside a diameter of the mounting bolt pattern. As the ring member 14 is drawn against the mounting plate, sealing member 24 is compressed providing an internal seal thus making it unnecessary to individually seal the openings provided for the mounting bolts 28.

By providing for expansion of the sealing ring 14 after insertion into the opening it can be seen that the diameter of opening 32 and of the ring member 14 may be machined to nominal tolerances rather than to precise tolerances required in conventional resilient ring seals. Since the amount of compression of seal member 18 is not dependent solely on the difference between the diameters of the ring member 14 and the opening 32, these parts may be made with nominal dimensional tolerances by inexpensive machining processes by semi-skilled machinist. Further, since compression of the seal member is accomplished after insertion into the opening, there is no possibility of deforming seal 18 or damaging it when it is inserted into the opening. Thus it can be seen from the above description that there is provided herein a simple inexpensive sealing apparatus for a pressure vessel which is effective in maintaining a vacuum or positive pressure within the vessel.

Obviously many modifications and variations of the present invention are possible in light of the above teachings. For example, more than a single sealing member may be provided in the ring member if desired. Further, the mounting plate 12 may be attached to the vessel 10 by means of a flange and bolts in a conventional manner or other well known clamping means.

What is claimed is:

1. Apparatus for sealing an opening in a pressure vessel comprising:
   a mounting plate attached to said vessel and mounted in said opening;
   a deformable cylinder attached to said mounting plate and mounted within said opening and having a peripheral groove in the outer surface thereof;
   a resilient seal member mounted in the groove in said cylinder adjacent the inner wall of said opening; and
   means associated with said mounting plate for deforming said cylinder when said cylinder is attached to said mounting plate whereby said resilient seal member is forced into sealing contact with the inner surface of said opening.

2. Apparatus for sealing an opening in a pressure vessel according to claim 1 wherein said cylinder comprises a circular cup-shaped ring in which the closed end of the cup is attached to said mounting ring and the peripheral groove is provided near the lip of said cup-shaped ring.

3. Apparatus for sealing an opening in a pressure vessel according to claim 2 wherein said means for deforming said cup-shaped ring member comprises:
   a peripheral chamfered surface on said mounting plate at the side thereof adjacent said ring member; and
   means for drawing the closed end of said cup-shaped ring member against said peripheral chamfered surface.

4. Apparatus for sealing an opening in a pressure vessel according to claim 3 wherein the peripheral groove in said ring member is substantially wider than the thickness of said resilient seal member whereby said seal member is rolled into sealing contact with the inner wall of said opening.

5. Apparatus for sealing a circular opening in a pressure vessel comprising:
   a circular mounting plate attached to said vessel in said opening and having on the surface internal to said vessel opening a peripheral chamfered surface and a circular groove concentric with the outside diameter of said plate, said groove being of a smaller diameter than said chamfered surface;
   a cylinder having one closed end and attached to the inside surface of said mounting plate at the closed end and having the opening end extending into said opening and having a peripheral groove in the outer surface of said cylinder near the open end thereof;
   a first resilient sealing ring mounted in the groove of said cylinder;
   a second resilient sealing ring in the groove in said mounting plate;
   fastening means for fastening said cylinder to said mounting plate and for drawing the closed end of said cylinder against the chamfered surface of said mounting plate whereby said first resilient seal is pressed against the inside surface of said opening and said second resilient seal is pressed between said mounting plate and said cylinder.

6. Apparatus for sealing a circular opening in a pressure vessel according to claim 5 wherein said fastening means is a plurality of bolts extending through holes in said mounting plate, said holes being arranged in a symmetrical pattern about the center of said mounting plate on a diameter larger than the diameter of the groove in said mounting plate, said bolts being threaded into corresponding holes in the surface of the closed end of said cylinder adjacent to said mounting plate.

References Cited

UNITED STATES PATENTS 3,151,763 10/1964 Paviso _____ 220—46
3,156,375 11/1964 Long _____ 220—46

GEORGE T. HALL, Primary Examiner

U.S. Cl. X.R.

285—340